3,180,794
CONJUGATED BILE ACID SEPARATION
Harold J. Antonides, Kankakee, Ill., assignor, by mesne assignments, to Armour Pharmaceutical Company, a corporation of Delaware
No Drawing. Filed Sept. 26, 1960, Ser. No. 58,161
9 Claims. (Cl. 167—55)

My invention relates to the separation of conjugated bile acids, and to taurocholic acid which is essentially free of glycocholic acid.

The liver secretion known as bile contains conjugated glycocholic acid and taurocholic acid. In these compounds cholic acid is combined, or conjugated, with the amino acids taurine or glycine. Ox bile extract prepared from fresh bladder bile by solvent extraction of concentrated bile is alkaline in pH and essentially consists of a mixture of sodium glycocholate and sodium taurocholate with minor amounts of other conjugated bile acid. As the pH of these salts falls below neutrality they become acids.

Usual methods of preparing purified bile acids involve saponification or hydrolysis of the conjugated natural products to provide free or unconjugated bile acids, especially cholic acid. Heretofore taurocholic acid and glycocholic acid have been extremely difficult to obtain from natural sources. Commonly used forms of conjugated bile acids are extracts consisting of mixtures of several bile acids in varying stages of decomposition.

It is well-known that crude bile products and bile extracts containing glycocholic and taurocholic acids produce nausea and vomiting when administered in a form which is stomach active. For this reason bile products used for medicinal purposes are either supped as insoluble complexes which do not function as emulsifiers in the stomach, or as enteric coated doses which are unavailable in the stomach. I have discovered that the irritating effects of bile are due primarily to glycocholic acid; glycocholic-free taurocholic acid is non-irritating. In addition, at normal stomach acidity of around pH 1.5 to 3.0, taurocholic acid is soluble and acts as a surfactant aiding in the preparation of foods for absorption and digestion, while glycocholic acid is rendered insoluble at stomach pHs. Previously there has been no easily prepared conjugated bile acid product available which acts in the stomach as an emulsification and solubilization agent.

Accordingly, I have discovered that the use of one aspect of my invention, which provides a simple method of separating glycocholic acid from taurocholic acid, can supply well tolerated bile preparations which are physiologically active at low pHs as found in the stomach.

The primary object of this invention is to provide a simple process for separating the conjugated acids of crude bile. Another object is to provide a method for furnishing stomach active bile activity. Other objects and advantages will become apparent as the specification proceeds.

One aspect of this invention is based on the discovery that taurine conjugated bile acids are not rendered insoluble but remain in solution when acidified in the presence of trivalent cations.

In a preferred separation embodiment of this invention three basic steps may be used. The first step is a purification process to remove extraneous protein, fat, cholesterol, and pigments from bile by the use of zinc sulphate. The next step is the precipitation of the glycine conjugate by trivalent metallic ions. A third step involves final purification and drying of the soluble bile fractions containing the taurine conjugates.

As outlined, a crude bile product, preferably ox bile is purified by use of zinc sulphate. This purification procedure is well known in the prior art. Crude bile is adjusted to approximately pH 10 to 12 with sodium hydroxide. Zinc sulphate solution may then be added and the mixture agitated. A molecular equivalent of zinc sulphate, which reacts with sodium hydroxide to produce zinc hydroxide, is added. The pH of the resulting mixture may be adjusted to about 7.5 by using a mineral acid such as hydrochloric or sulphuric. The mixture is then separated, preferably by filtration, and the filtrate retained. After this separation which removes precipitated and adsorbed impurities, a solution of a salt containing a trivalent metallic ion is then added to the filtrate and the pH adjusted to about 4.0. Examples of salts which are useable in this second step are aluminum chloride, aluminum nitrate, aluminum acetate, ferric chloride, ferric nitrate, chromic chloride, and the like. It has been found that divalent metallic ions such as ferrous, calcium, manganese, magnesium, and so on do not possess the desirable precipitation properties of the trivalent ions. Only the trivalent metallic ions complex the glycine conjugated acids which are then precipitated as water insoluble complexes. During this fractionation step a pH of about 3.7 to 5.5 may be used. A slight excess of trivalent metallic ions is preferably supplied in the mixture to ensure removal of the non-taurine conjugates. The mixture is then separated as by filtration or by centrifugation and the filtrate retained.

The precipitate largely consists of metal complexed glycocholic acid. Purified glycocholic acid may be prepared from the precipitate by raising the pH of the complex, as with NaOH, to split the complex and give soluble glycocholic acid.

Processing of the filtrate during step 3 involves further purification of the filtrate. This filtrate contains taurocholic acid and water soluble salts such as sodium chloride and sodium sulphate. Preferably the filtrate is concentrated by vacuum distillation or comparable means and dried. Although other methods of drying may be employed, vacuum concentration to about 50% solids followed by spray drying or pan drying is preferred for economic reasons. After drying the filtrate is slurried with alcohol, optimally 99% methanol. I prefer to use water soluble alcohols but many other organic solvents may also be employed as satisfactory solvent. The slurry may then be filtered and dried. If desired, charcoal decolorizing may be accomplished at this time. Preferably the alcohol filtrate is vacuum concentrated and is pan dried, although other means of drying may be satisfactorily used.

The dried and purified filtrate essentially consists of taurocholic acid which has the empirical formula $$C_{26}H_{45}NO_7S$$

and a molecular weight of 515.69. It is a buff-colored powder having a mild characteristic odor and taste, freely soluble in water over a wide pH range, and soluble in alcohols and hydro-alcoholic solutions.

It is believed that the naturally occurring conjugated bile acids provide the most desirable form of bile activity for improvement of certain metabolic processes. The free or unconjugated forms of bile acid are found in the body only in pathological conditions, especially of the liver. Normal bile essentially contains completely conjugated forms of the bile acids.

The conjugated bile acids are thought to be essential in the digestion and metabolism of fats by acting as emulsifiers and lipase enzyme system activators. Glycocholic-free taurocholic acid may be added to triglyceride nutritional products suitable for oral administration to thereby facilitate their digestion. Taurocholic acid may be combined with digestive enzymes to produce the necessary components for digestion of foods in malfunctioning digestive states.

The conjugated acids also play important roles in the absorption of oil soluble vitamins such as A, D, E and K from the intestinal tract. In addition, they have a possible role in solubilizing cholesterol in body fluids. Only taurocholic acid is active in the stomach as a well tolerated emulsification and solubilization agent.

The following specific example will serve to further illustrate my invention.

7,200 lbs. of ox bile caustic treated to about pH 11 was placed in a glass lined tank. 21 gallons of a 40% zinc sulphate solution, containing 71.5 lbs. of zinc sulphate, was added to the alkaline bile.

Sufficient sulphuric acid was added to give a pH of about 7.5. After agitating for 30 minutes, the acidity was readjusted to between 7.5 and 7.6 with additional sulphuric acid. With continued agitation, 143 lbs. of filter aid (Celite 535) was added to the bile. The treated bile was then filtered through a frame press using 8 ounce canvas duck. After completion of filtering the press was broken, the cake removed, the canvas water washed and the cake retained.

After readjusting the filtrate to about pH 7.5 with sulphuric acid, sufficient 20% ferric chloride solution was added to adjust the pH to 5.0. After 15 minutes agitation additional ferric chloride solution was added to attain a pH of 3.8. Addition of the ferric chloride caused precipitation within the filtrate. This slurry was filtered through the reassembled press, the cake thoroughly water washed and retained for drying.

The filtrate was dried by inspissation and alcohol extracted. 7.5 liters of methanol, 0.4 lb. activated charcoal and 0.8 lb. filter aid were added to 11 lbs. of the dried filtrate. After heating and mixing to dissolve the taurocholic acid in the methanol, the mixture was filtered. The dried filtrate was extracted 3 times with about 3 liters of methanol being used for the second and third extractions.

The methanol extracted filtrate was concentrated in a vacuum still and the methanol removed for further use. The concentrate of taurocholic acid and methanol was then vacuum dried. Identity and composition of the dried taurocholic acid was confirmed by elemental, chromatographic and spectrophotometric methods.

The foregoing detailed description has been given for clearness of understanding only. No unnecessary limitations should be understood therefrom, as it will be apparent to those skilled in the art that this invention is susceptible to other embodiments and that many of the details can be varied widely without departing from the basic concept and spirit of the invention.

I claim:

1. The process of fractionating conjugated acids of bile comprising the steps of acidifying bile material to pH of about 7.5; adding to said material a salt containing a trivalent metallic ion selected from the group consisting of aluminum, ferric, and chromic in an amount sufficient to render insoluble glycine conjugated bile acids and separating out the insolubilized bile acids.

2. The process of fractionating conjugated bile acids comprising the steps of acidifying unhydrolyzed bile material to about pH 3.7 to 5.5 while adding thereto a salt containing trivalent cations, selected from the group consisting of aluminum, ferric and chromic, in amounts sufficient to render insoluble glycine conjugated acids of bile, and separating out the insolubilized acids.

3. The process of fractionating conjugated bile acids comprising the steps of acidifying bile material to about pH 3.7 to 5.5 while adding thereto a salt containing aluminum ions to insolubly complex glycine conjugated bile acids, and collecting the resulting complex.

4. The process of fractionating bile acids comprising the steps of acidifying crude bile material to about pH 3.7 to 5.5, adding ferric ions to thereby render insoluble glycine conjugated acids, and separating out the insoluble acids.

5. The process of fractionating conjugated acids of bile comprising the steps of acidifying crude bile material to about pH 3.7 to 5.5 by adding thereto a salt containing trivalent cations, selected from the group consisting of aluminum, ferric and chromic, in amounts sufficient to insolubly complex glycine conjugated acids of bile, filtering the bile material to thereby form a filtrate, drying said filtrate, slurrying the dried filtrate with alcohol, filtering the alcohol slurry, and drying the alcohol filtrate.

6. The process of fractionating conjugated bile acids comprising the steps of adjusting the pH of crude bile to about 10 to 12, adding zinc sulphate solution, adjusting the bile to about pH 7.5 by the addition of a mineral acid thereto, filtering the bile to thereby prepare a filtrate, collecting the filtrate, adding a salt containing trivalent cations, selected from the group consisting of aluminum, ferric and chromic, to the filtrate in amounts sufficient to insolubly complex glycine conjugated bile acids, refiltering the bile to form a second filtrate, and collecting the second filtrate.

7. The process of preparing a bile product that essentially consists of taurocholic acids comprising the steps of adjusting the pH of crude bile material to about 10 to 12, adding zinc sulphate solution, reducing pH of the mixture to about 7.5 with a mineral acid to thereby purify the material, filtering the purified material to form a filtrate, retaining said filtrate, adding ferric ions to the filtrate while adjusting its acidity to pH of about 3.7 to 5.5 to thereby cause precipitation of glycocholate conjugates, separating the conjugates from the filtrate, evaporating said filtrate to dryness, slurrying the dried filtrate with a water soluble alcohol, filtering the alcohol slurry, and drying the alcohol filtrate.

8. The process of fractionating conjugated acids of bile from a mixture thereof having a pH of not over about 7.5 and from which substantially all extraneous protein, fat, cholesterol and pigments have been removed comprising: adding a salt containing trivalent cations, selected from the group consisting of aluminum, ferric and chromic, to said mixture in amount sufficient to insolubilize substantially all glycine-conjugated bile acids therein and reduce the pH thereof to from about 3.7 to about 5.5; and removing said insolubilized glycine-conjugated bile acids from said mixture.

9. In a process for providing stomach active bile activity, the step of orally administering a taurocholic acid preparation which has been fractionated free of glycocholic acid by adding to a bile material containing substantially no-zinc a sufficient amount of a salt containing trivalent cations, selected from the group consisting of aluminum, ferric and chromic, to render non-taurine bile acids insoluble, and removing the insolubilized bile acids therefrom.

References Cited in the file of this patent

Vahouny et al.: Amer. J. Physiol., vol. 188, pages 342–346, 1957.

Vahouny et al.: Amer. J. Physiol., vol. 191, pages 179–184, 1957.

Vahouny et al.: Proc. Soc. Exptl. Biol. and Med., vol. 101, No. 3, pages 538–540, 1959.

De Haen: J. Am. Pharm. A., vol. 33, pages 161–168, 1944.

Wiggins et al.: The Biochem. J. vol. 70, No. 2, pp. 349–352, October 1958.

U.S. Dispensatory 25, 1955, pp. 942–944.

Carey et al.: J. Lab. and Clin. Med., 44 (3), September 1954, pp. 486–489 through Current List Med. Lit., vol. 27, 1955, entry 13510.